(12) United States Patent
Khullar et al.

(10) Patent No.: US 11,797,511 B2
(45) Date of Patent: Oct. 24, 2023

(54) ON-LINE TRANSACTION PROCESSING DATABASE WAIT TIME ESTIMATION USING LINEAR REGRESSION MODEL

(71) Applicant: SAP SE, Walldorf (DE)

(72) Inventors: Vipul Khullar, New Delhi (IN); Kirti Sinha, Delhi (IN)

(73) Assignee: SAP SE, Walldorf (DE)

( * ) Notice: Subject to any disclaimer, the term of this patent is extended or adjusted under 35 U.S.C. 154(b) by 60 days.

(21) Appl. No.: 17/217,497

(22) Filed: Mar. 30, 2021

(65) Prior Publication Data

US 2022/0318222 A1    Oct. 6, 2022

(51) Int. Cl.
*G06F 16/22* (2019.01)
*G06F 16/23* (2019.01)
*G06N 20/00* (2019.01)

(52) U.S. Cl.
CPC .......... *G06F 16/2282* (2019.01); *G06F 16/23* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,810,636 | B1 * | 10/2020 | Sulejmani | H04W 4/027 |
| 11,120,364 | B1 * | 9/2021 | Gokalp | G06N 20/00 |
| 2009/0125501 | A1 * | 5/2009 | Gao | G06F 40/216 |
| | | | | 707/999.005 |
| 2009/0281817 | A1 * | 11/2009 | Ferrara | G06Q 30/02 |
| | | | | 705/1.1 |
| 2015/0003604 | A1 * | 1/2015 | McCormack | H04M 3/5233 |
| | | | | 379/265.12 |
| 2016/0363450 | A1 * | 12/2016 | Sahay | G06Q 10/06 |
| 2019/0258732 | A1 * | 8/2019 | Chakra | G06F 16/2453 |
| 2020/0334592 | A1 * | 10/2020 | Garg | G06Q 10/04 |
| 2022/0138175 | A1 * | 5/2022 | Mahendra Kumar | ...... |
| | | | | G06F 16/2343 |
| | | | | 707/694 |

OTHER PUBLICATIONS

Murphy, Conor, Prof. Siobhan Clarke, Predicting Queueing Times Using Queueing Theory & Predictive Analytics, MCS Dissertation, Trinity College Dublin, The University of Dublin, May 2018 (Year: 2018).*

\* cited by examiner

*Primary Examiner* — Richard L Bowen
(74) *Attorney, Agent, or Firm* — Buckley, Maschoff & Talwalkar LLC

(57) ABSTRACT

Embodiments may be associated with database access. In some embodiments, a machine learning linear regression training platform determines a set of database properties (e.g., direct and/or indirect properties such as a document type, a type of process, a number of items, etc.) associated with Online Transaction Processing ("OLTP") database table access. The machine learning linear regression training platform may then train a linear regression model based on the set of database properties and prior locking information (e.g., locking and unlocking timestamps) that represent access to the OLTP database table. Information about the linear regression model may be output to a wait time estimation platform that adapted to use the linear regression model to generate, in substantially real-time, an estimated wait time for an OLTP database table access based on the database properties of the OLTP database table access.

15 Claims, 12 Drawing Sheets

ON-LINE TRANSACTION PROCESSING DATABASE WAIT TIME ESTIMATION USING LINEAR REGRESSION MODEL

BACKGROUND

An enterprise, such as a business, might store information in an On-Line Transaction Processing ("OLTP") database. As used herein, the phrase "OLTP database" might refer to, for example, a system storing information about order entry, retail sales, financial transaction systems, etc. For example, FIG. 1 is a sample OLTP database design 100. In this design 100, a sales order header 110 is associated with an order number (e.g., a primary key), a document type, and a status. The sales order header 110 has a one-to-many mapping to sales order items 120, each of which may be associated with an order number (primary key)-foreign key and an order item number (primary key). Similarly, each sales order item 120 may have a one-to-many mapping to delivery items 130, each of which may be associated with an order number (primary key)-foreign key, an order item number (primary key)-foreign key, and a delivery item number (primary key). In general, OLTP involves gathering input information and/or processing the data.

In transactional processing, one process may wait for another process to end due to resource locking that happens at a database level for an object key. For example, FIG. 2 illustrates a OLTP access locking mechanism 200. At (A), a first process 210 accesses an OLTP database 250. Moreover, the first process 210 locks 260 the database 250 table for an object key, which is also required to be updated by a second process 220. Hence, at (B) the second process 220 must wait for the first process 210 to release the lock 260 on the object key in the database 250 table.

In the traditional handling of such scenarios, the second process 220 usually waits for the first process 210 to finish for a fixed interval of time. If the first process 210 releases the lock 260 on the database 250 table (which the second process 220 has requested) during the wait time of the second process 220, then the second process 220 will execute seamlessly after the fixed wait time. Otherwise, the second process 220 might have to be aborted.

There are several challenges with this approach. For example, the second process 220 always waits for the same fixed interval of time before re-attempting the lock 260, which can lead to buffer time that gets wasted while waiting (e.g., when the lock 260 gets released before the fixed wait time expires). In addition, there is no way for the second process 220 to know the approximate wait time and to make a timely, information decision about whether or not to abort the process.

It would therefore be desirable to automatically estimate an OLTP database access wait time in an efficient and accurate manner.

SUMMARY

Embodiments may be associated with database access. In some embodiments, a machine learning linear regression training platform determines a set of database properties (e.g., direct and/or indirect properties such as a document type, a type of process, a number of items, etc.) associated with Online Transaction Processing ("OLTP") database table access. The machine learning linear regression training platform may then train a linear regression model based on the set of database properties and prior locking information (e.g., locking and unlocking timestamps) that represent access to the OLTP database table. Information about the linear regression model may be output to a wait time estimation platform that adapted to use the linear regression model to generate, in substantially real-time, an estimated wait time for an OLTP database table access based on the database properties of the OLTP database table access.

Some embodiments comprise: means for determining, by a computer processor of a machine learning linear regression training platform, a set of database properties associated with Online Transaction Processing ("OLTP") database table access; means for training a linear regression model based on the set of database properties and prior locking information representing access to the OLTP database table; and means for outputting information about the linear regression model.

Other embodiments may comprise: means for receiving, by a wait time estimation platform, the information about the linear regression model; and means for using a linear regression model to generate, in substantially real-time, an estimated wait time for an OLTP database table access based on database properties of the OLTP database table access.

Some technical advantages of some embodiments disclosed herein are improved systems and methods that estimate an OLTP database access wait time in an efficient and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 3:
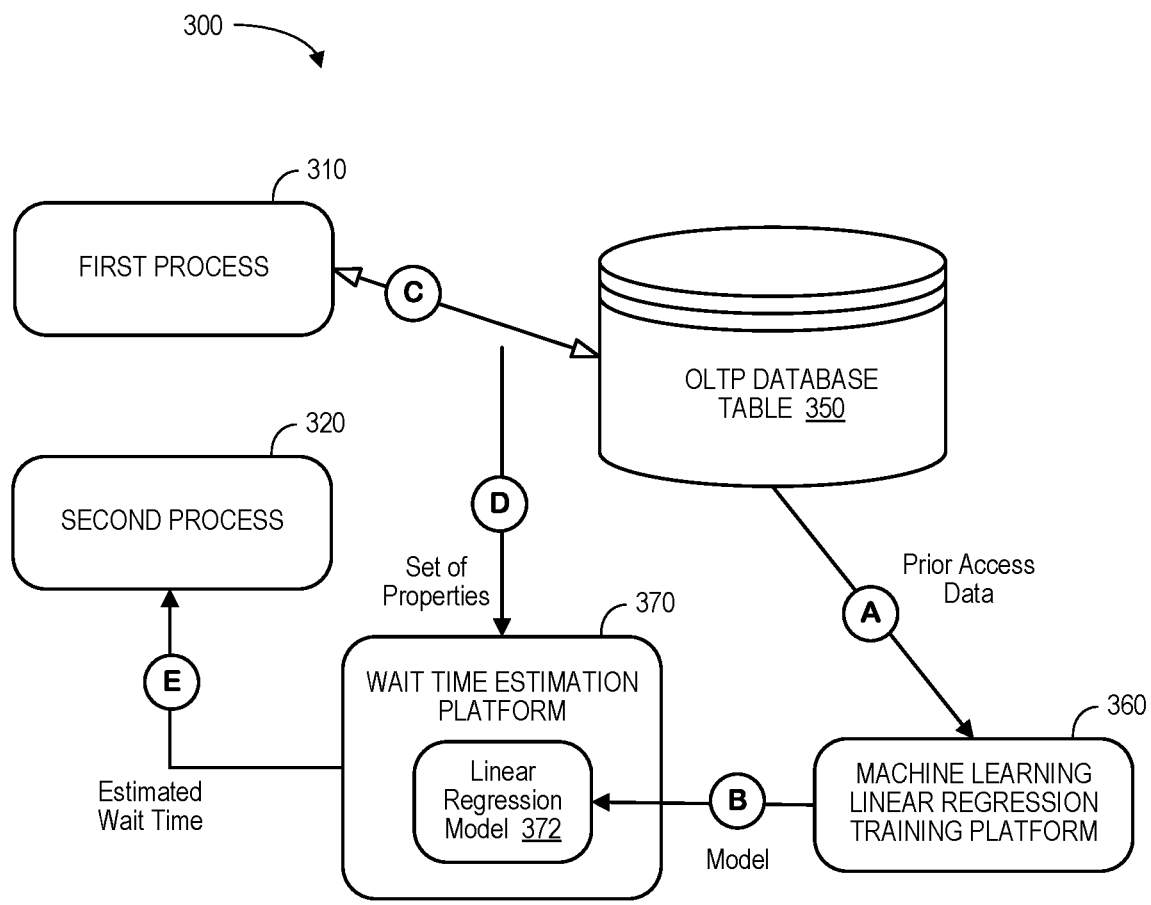
FIG. 3 is a high-level architecture of a system according to some embodiments.

In OLTP systems, there may be cases in which one transactional process is dependent upon the completion of other processes. This may happen, for example, because of resource interdependency when one process needs to acquire a lock on a database resource that is currently being locked by another process. There are multiple instances when a software program may need to estimate an approximate wait time for a dependent process. In such a scenario, the concept of a fixed wait time is often used to temporarily suspend the processing of dependent program until the first process is completed. This can lead to substantial performance overhead. To avoid such a problem, FIG. 3 is a high-level architecture of a system 300 according to some embodiments. In particular, at (A) a machine learning linear regression training platform 360 may train a model using prior access data associated with an OLTP database table 350. The OLTP database table 350 may, for example, contain electronic records associated with an enterprise such as business information, financial information, Enterprise Resource Planning information ("ERP"), Customer Relationship Management ("CRM") information, etc. At (B), details about the trained model 372 may be provided to a wait time estimation platform 370.

As used herein, the phrase "machine learning" may refer to, for example, an artificial intelligence process using computer algorithms that improve automatically through experience and by the use of data. Machine learning algorithms may build a model based on sample data, known as "training data," to make predictions or decisions without being programmed to do so explicitly. In this case, information about prior accesses to the OLTP database table 350 (e.g., database properties and locking times) may be used to train the model 372. Moreover, the phrase "linear regression model" may refer to a linear approach to modelling the relationship between a scalar response and one or more explanatory variables (e.g., dependent and independent variables). At (C), a first process 310 locks the database table for a particular key/record and a second process then requests the lock for the same key/record. Information about that access and the model 372 may be used by the wait time estimation platform 370 at (D) to predict how long that lock will remain in place. This estimated time is provided to the second process 320 (that also wants to access the database table 350) at (E) which might then decide whether to wait for the lock to be removed, abort the attempt to access the database table 350, etc.

According to some embodiments, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 300 may store information into and/or retrieve information from various data stores (e.g., the OLTP database table 350), which may be locally stored or reside remote from the machine learning linear regression training platform 360 and wait time estimation platform 370. Although a single machine learning linear regression training platform 360 and wait time estimation platform 370 are shown in FIG. 3, any number of such devices may be included. Moreover, various devices described herein might be combined according to embodiments of the present invention. For example, in some embodiments, the machine learning linear regression training platform 360 and wait time estimation platform 370 might comprise a single apparatus. Some or all of the system 300 functions may be performed by a constellation of networked apparatuses, such as in a distributed processing or cloud-based architecture.

A user (e.g., an operator or administrator) may access the system 300 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define a set of database properties) and/or provide or receive automatically generated recommendations or results from the system 300.

Note that an overall wait time may be dependent upon certain attributes or properties that are associated with the process and database record that is being locked. Hence, embodiments may use the machine learning linear regression model 372 to predict the wait time after which the lock on a database entity would be released by the first process 310 for the second process 320. Some embodiments may combine the machine learning based estimator with a framework for intelligent maintenance of data to avoid performance overload and implement a framework for smart data buffering. The estimator may, in some embodiments, use a dynamic model that keeps looking for possible improvements based on new fields or properties. The training parameters of the model may be, for example, a combination of attributes associated with the process and the database record. As described in connection with FIG. 6, the system may also reduce the number of calls to the external machine learning model using a buffering framework, thus reducing the dependency on an integration framework.

Figure 4:
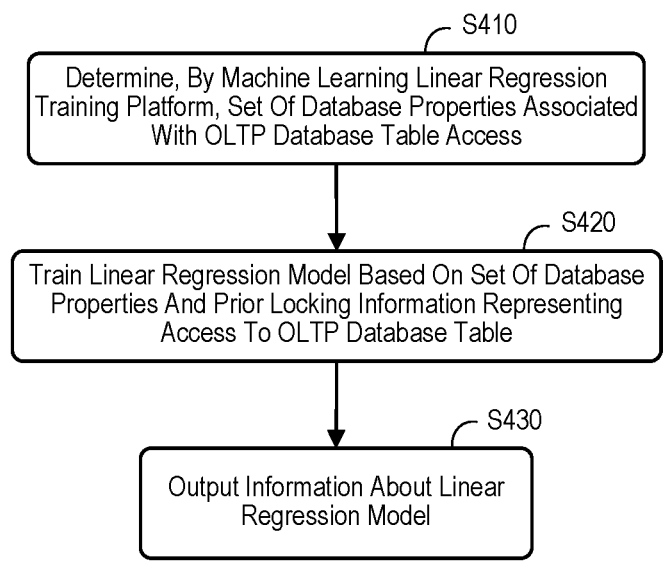
FIG. 4 is a machine learning training method in accordance with some embodiments.

FIG. 4 is a machine learning training method in accordance with some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S410, a computer processor of a machine learning linear regression training platform may determine a set of database properties associated with OLTP database table access. The properties might be determined by an administrator or an automated analysis of prior database accesses. In some embodiments, the database properties include direct properties directly associated with the OLTP database table and/or indirect properties that are indirectly associated with the OLTP database table via a foreign key relationship. Examples of database properties might include, for example: a type of process accessing the OLTP database table, a document type, a number of line items in a sales order, a number of line items in a delivery, a quantity of a sales order, a sales order type, other database properties, etc.

At S420, the system may train a linear regression model based on the set of database properties and prior locking information representing access to the OLTP database table. For example, the prior locking information might include a locking timestamp associated with enqueuing along with an unlocking timestamp associated with de-queuing. In some embodiments, the machine learning linear regression training platform trains the linear regression model asynchronously using batches of prior locking information. Moreover, the machine learning linear regression training platform may further automatically and dynamically update the set of database properties (e.g., by adding or deleting properties) to improve future models. At S430, the system may output information about the linear regression model (e.g., to a wait time estimation platform).

Figure 5:
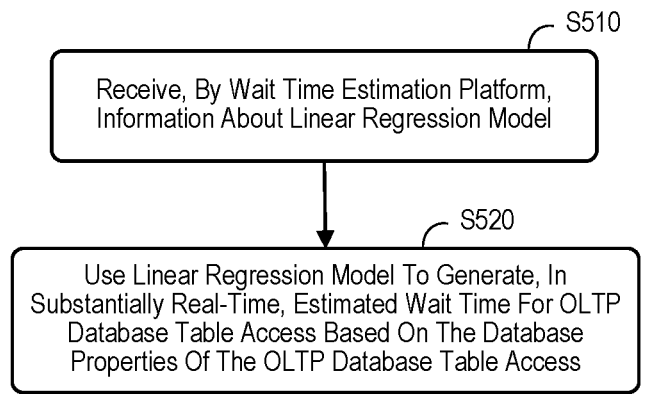
FIG. 5 is an access time estimation method according to some embodiments.

FIG. 5 is an access time estimation method according to some embodiments. At S510, a wait time estimation platform may receive information about a linear regression model. Using the linear regression model at S520, the system may generate, in substantially real-time, an estimated wait time for an OLTP database table access based on database properties of the OLTP database table access. In some embodiments, the wait time estimation platform incorporates a data buffering framework with a solution database to reduce use of the linear regression model.

Note that in the past many techniques have been applied to improve concurrency in OLTP databases. Some of those are techniques such resource modelling in which the problem is addressed by employing statistical models that provide resource and performance analysis and prediction for highly concurrent OLTP workloads to understand which queries are using substantial resources. Other techniques have been explored for scheduling balance between concurrency to maximize throughput and scheduling transactions linearly to avoid conflicts. Some tools automatically change the application such that contentious queries are issued as late as possible. However, the idea of having a wait time is novel in terms of enabling multi-threaded asynchronous processes. Although prediction models for queue wait time are known in the software industry, the prediction of wait time in OLTP as described herein is unique.

There are multiple transactions that face the challenge of disconnection in the case of a highly loaded cloud/server system. For example, banks often deal with the challenges due to lock concurrency. Resource prediction and performance analysis are both important in such a setting. The challenges may result from high degrees of concurrency, competition for resources, and/or complex interactions between transactions (all of which non-linearly impact performance). Some embodiments described herein use a machine learning regression to predict the wait time for the locking of database tables during transactional processing so that appropriate decision making can take place during runtime. Further, embodiments may utilize a generic framework to predict wait times for database table locks via a machine learning regression model.

Figure 1:
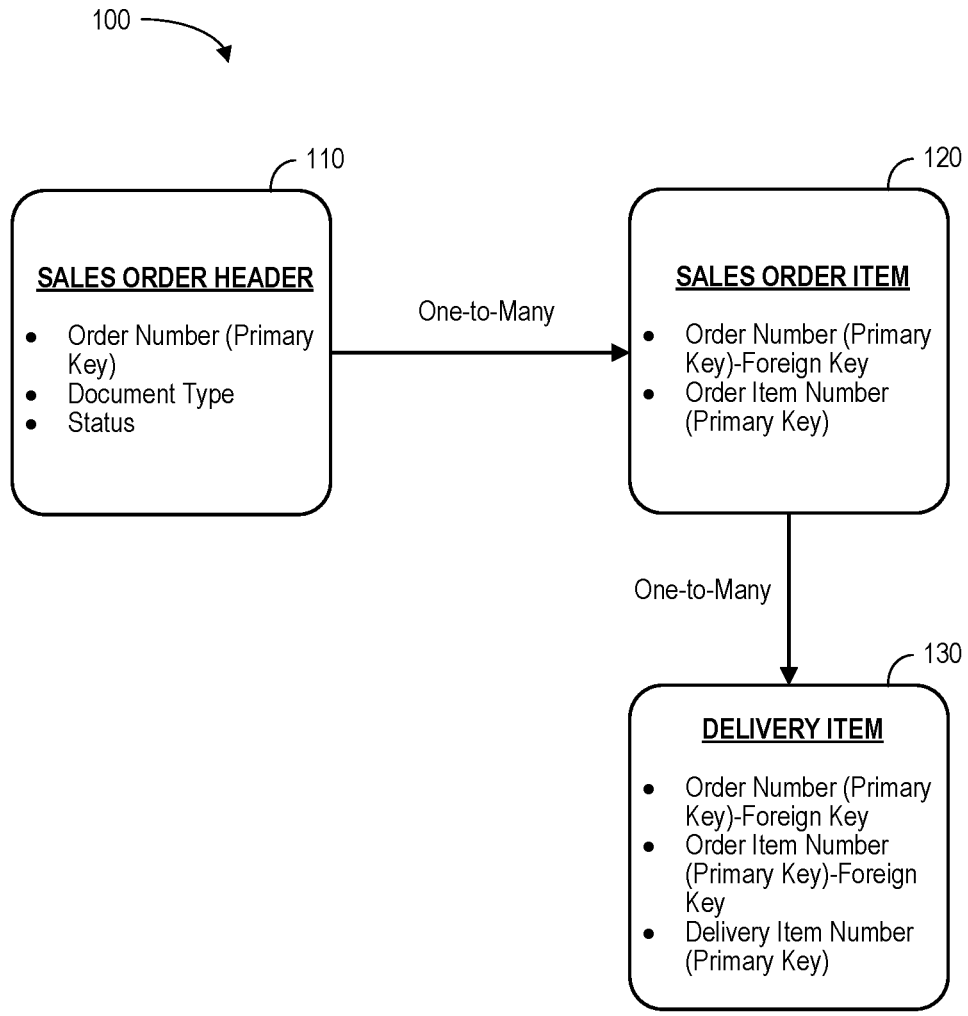
FIG. 1 is a sample OLTP database design.
Figure 2:
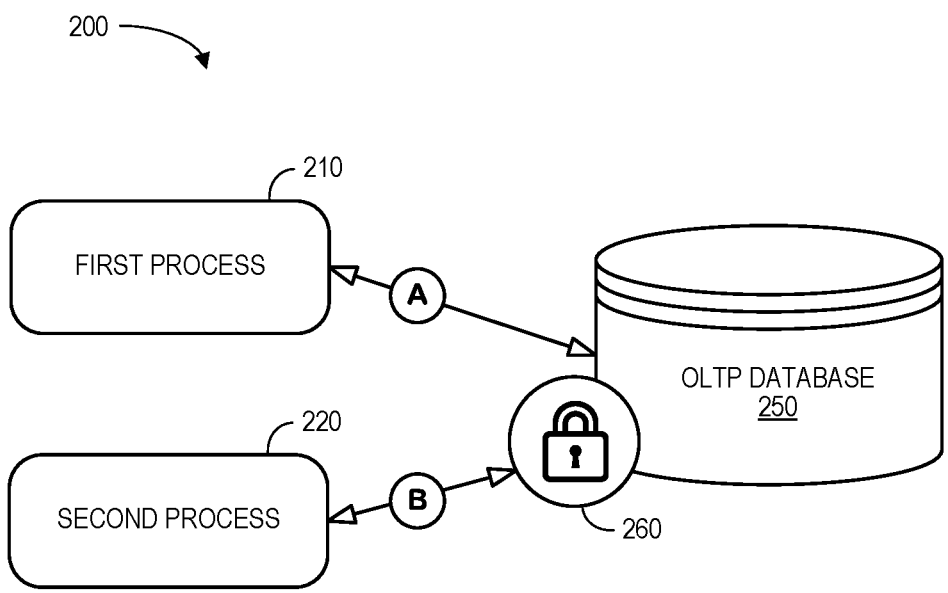
FIG. 2 illustrates a OLTP access locking mechanism.

Note that the overall wait time for a database table may be dependent upon certain variables associated with the process locking the database table and/or the table itself. For example, consider the example of an ERP scenario (e.g., similar to the design 100 described in connection with FIG. 1) where the time for which a person or a process locks a sales order database table for routine operations is a direct function of the following:
- the type of the process locking the database table,
- the number of line items in the sales order,
- the number of line items in delivery,
- the quantity in the sales order, and
- the specific type of the sales order.

Similar sets of properties may apply to any other type of business document or object created in the system.

Figure 6:
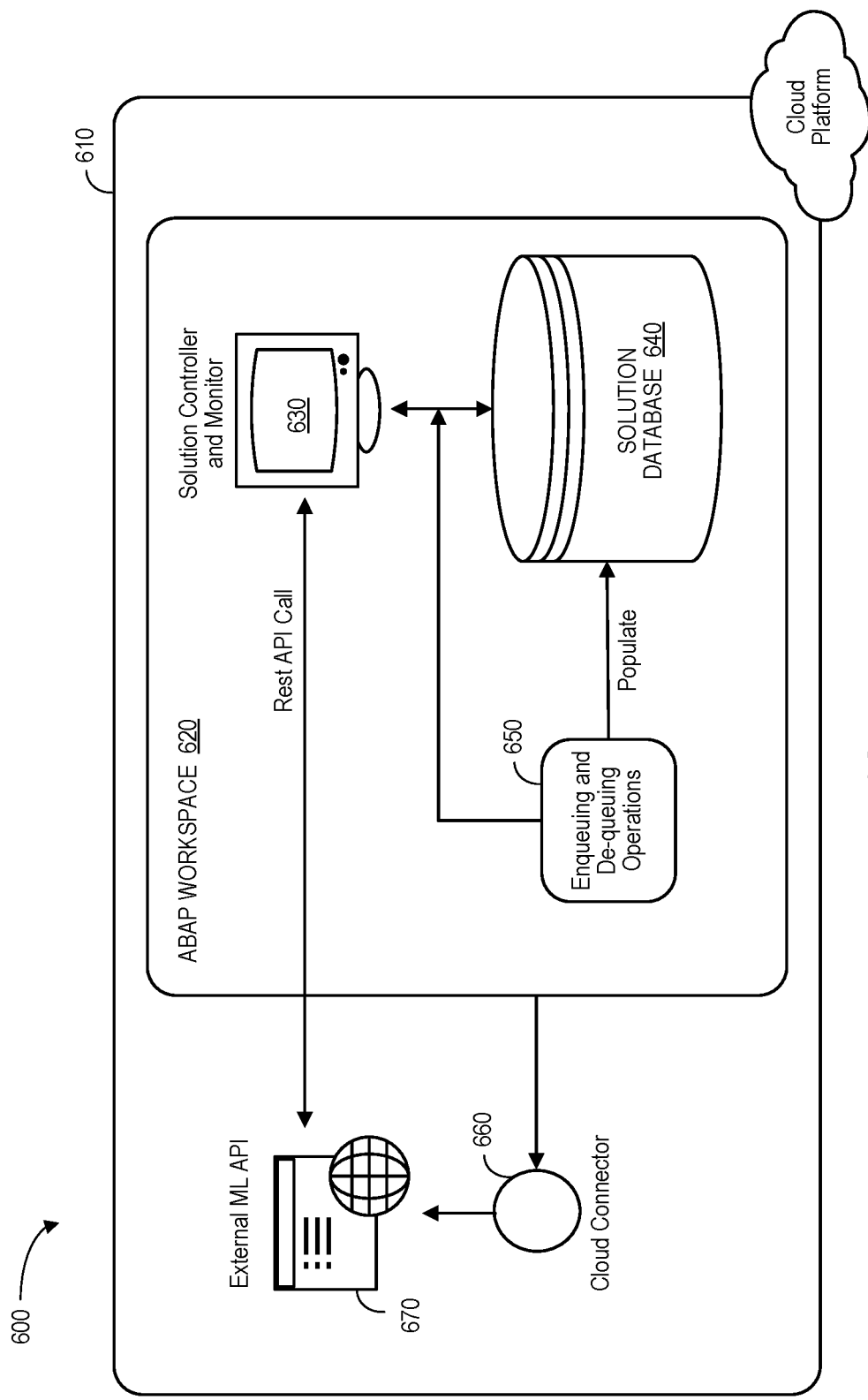
FIG. 6 is a more detailed system architecture in accordance with some embodiments.

FIG. 6 is a more detailed system 600 architecture in accordance with some embodiments. The system includes a cloud platform 610 with an Advanced Business Application Programming ("ABAP") workspace 620 that communicates with an external machine learning API 670 (e.g., via a cloud connector 660 or a Representational State Transfer ("REST") API call). Embodiments may then use the API 670 and a machine learning regression model to predict the wait time after which the lock on an object key in a database table is released for other processes. The parameters on which the model is trained could be a combination of some properties of the business document/object associated with the object key. These properties might be classified into, for example:
Direct properties that are directly associated to the database table. These could be values of the different fields in the database table or the number of records in the same database associated with the object key used for locking the records.
Indirect properties that are indirectly associated to the database table via foreign key relationship. These could be values of the different fields or the number of records associated with a key in the other database tables related to the original table via foreign key.

Figure 10:
FIG. 10 illustrates an input parameters database in accordance with some embodiments.

A configuration may then be defined in the reference system 600 to capture the properties that are relevant for wait time prediction using machine learning for each database table and enqueuing and de-queuing operations 650. With respect to a locking scenario (enqueuing), during each locking request for the database table a locking timestamp may be preserved along with relevant properties of the database table that are configured in the machine learning configuration. The information may, in some embodiments, be updated in an asynchronous task to not impact the overall performance of the process. Similarly, with respect to an unlocking scenario (de-queuing), during the unlocking of the database table the same record created during the locking may be updated with an unlocking timestamp. The unlocking information may again be updated in an asynchronous task to not impact the overall performance of the process. According to some embodiments, a batch job is executed in regular intervals to train the machine learning regression model. This data collected in locking and unlocking scenario may, for example, be passed to the external machine learning API 670. The model is trained based on the relevant parameters (e.g., as illustrated in FIG. 10).

Given an input vector $x \in R$ m, where $x_1, \ldots, x_m$ represent features (also called independent variables or predictors), the system 600 finds a prediction $\hat{y} \in R$ for the estimated wait time $y \in R$ using a linear regression model:

$$\hat{y} = \beta 0 + x > \beta$$

where $\beta 0$ and $\beta$ are the parameters to estimate. Usually, the parameters are learned by minimizing the sum of squared errors. To obtain models with high explanatory values, embodiments may use a linear regression model with Lasso (also called L1) regularization. Such an approach may minimize the sum of squared errors, but in addition may add a penalty term $\lambda \cdot \sum_{j=1}^{m} |\beta_j|$, where $\lambda$ is a constant that can be found by optimizing over the development data. As a result, such an approach may deliver sparse models. Some embodiments may utilize an Orthant-Wise Limited-memory Quasi-Newton ("OWLQN") approach to optimize the regularized empirical risk. Note that embodiments may evaluate models by reporting the correlation and Mean Absolute Error ("MAE").

When the model is trained with enough data, it can begin to estimate how long the database table for the business object will remain locked. Assume, for example, that a business object database table is requested to be locked by a first process and the first process acquires the lock. A second process then also requests the lock. The second process cannot lock the database table (because it is already locked by the first process), and the external machine learning model API 670 is queried to get the estimated wait time after which the first process will release the lock. The second process can then make a decision about whether to wait or instead abort the process.

Some embodiments may be based on a static model for training (that is, the same parameters can always be used to train the model and make estimates). However, it may be possible that the locking duration is a function of some properties that are not originally included in the initial model. This might be the case, for example, if new properties are introduced after an initial setup. For example, there could be new database tables added with foreign key relationship to the original table. As a result, in some embodiments the machine learning model may be programmed to keep looking for possible improvements based on the newly added tables and similar changes.

Some embodiments may obtain a wait time estimate every time an enqueued process is requested. To reduce the workload on the cloud connector 660 and the number of API calls, some embodiments may incorporate a data buffering framework with a solution database 640. The system 600 may store the results of frequent calls in this local solution database 640. Thus, the system 600 may not need to request results from the external machine learning API 670 each time, but instead prior queries may be analyzed, grouped, and stored in the solution database 640. The results from this database 640 can then be used by the enqueuing and dequeuing operations 650 to estimate wait time without using the model. This process may be administered by a solution controller and monitor 630 in the ABAP workspace 620.

Figure 7:
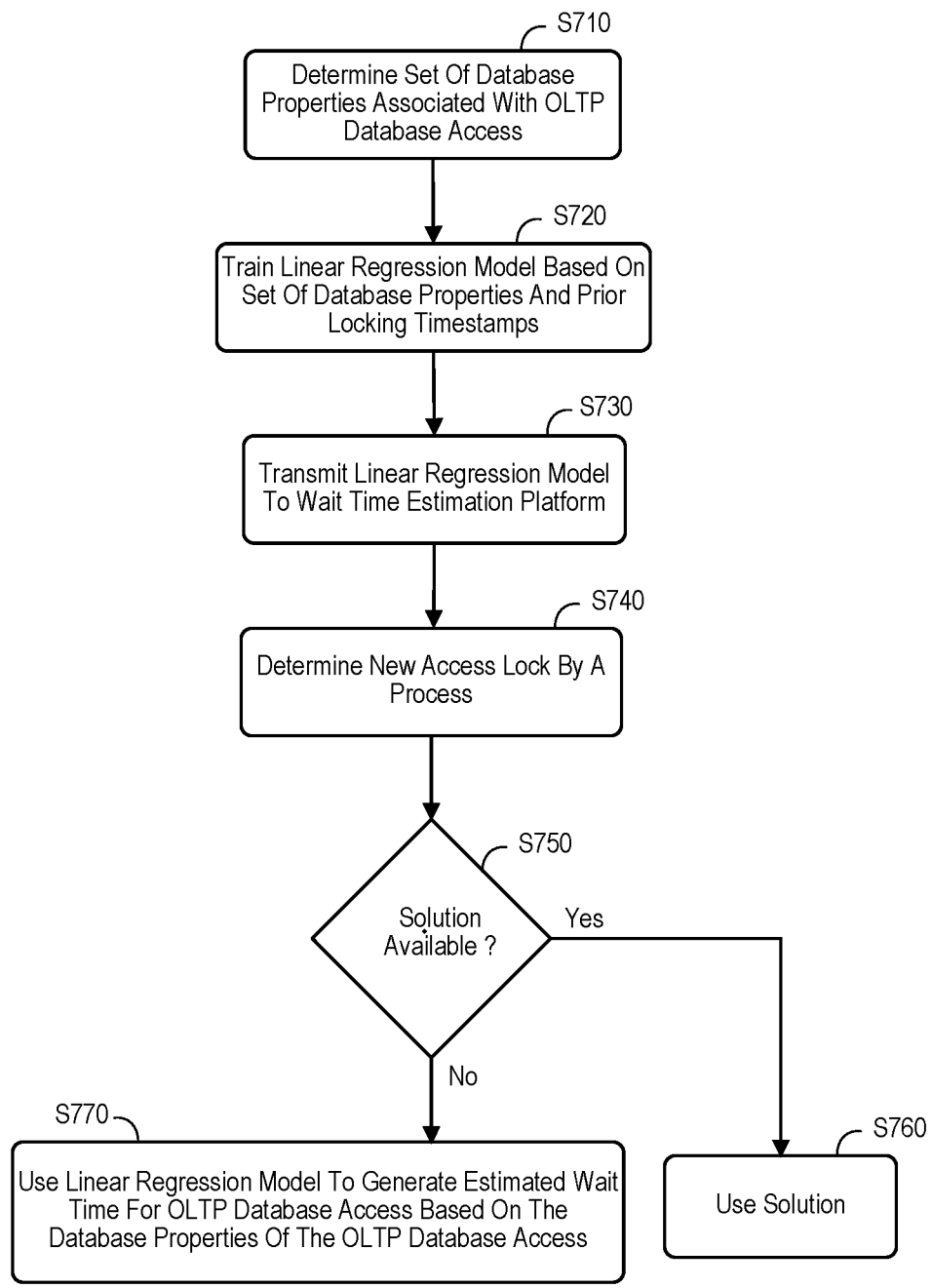
FIG. 7 is a more detailed method according to some embodiments.

FIG. 7 is a more detailed method according to some embodiments. At S710, a set of database properties associated with OLTP database table access may be determined. The properties (e.g., document type, calling process, and number of items) might be determined by an administrator or an automated analysis of prior database accesses. At S720, the system may train a linear regression model based on the set of database properties and prior locking information (e.g., a locking timestamp associated with enqueuing along with an unlocking timestamp associated with dequeuing. At S470, the system may transmit the linear regression model to a wait time estimation platform.

At S740, the system may determine that a new access lock for the OLTP database occurs. If a solution is already available at S750 (e.g., a number of similar locks recently occurred and wait times for those locks are locally available in a solution table), then the local solution is used at S760. Otherwise, at S770 the system uses the linear regression model to generate an estimated wait time for an OLTP database table access based on database properties of the OLTP database table access.

Figure 8:
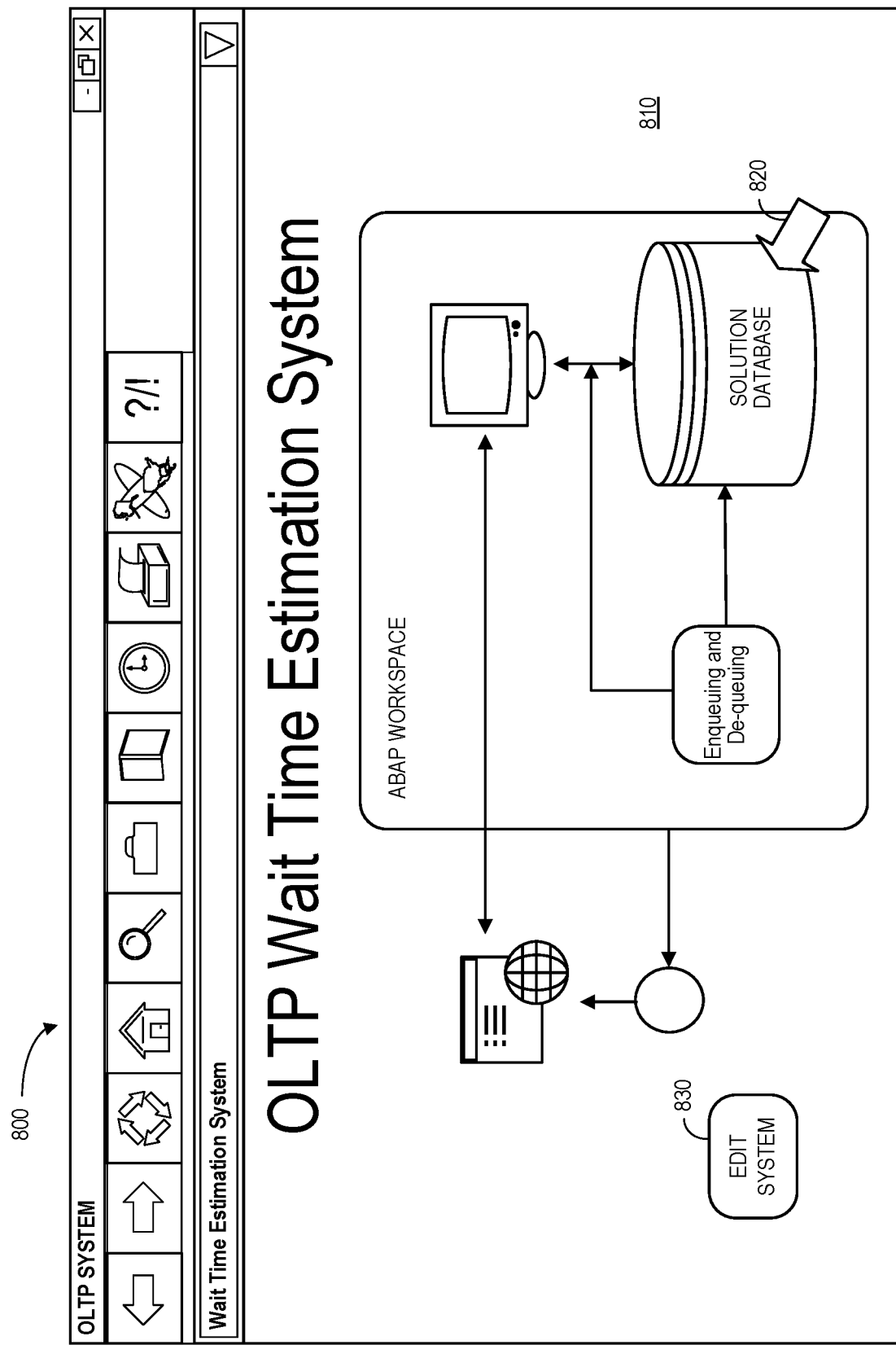
FIG. 8 is a human machine interface display according to some embodiments.

FIG. 8 is a human machine interface display 800 in accordance with some embodiments. The display 800 includes a graphical representation 810 or dashboard that might be used to manage or monitor a OLTP wait time estimation framework (e.g., associated with OLTP database table). In particular, selection of an element (e.g., via a touchscreen or computer mouse pointer 820) might result in the display of a popup window that contains configuration data. The display 800 may also include a user selectable "Edit System" icon 830 to request system changes (e.g., to adjust relevant model parameters, add a new table to the system, etc.).

Figure 9:
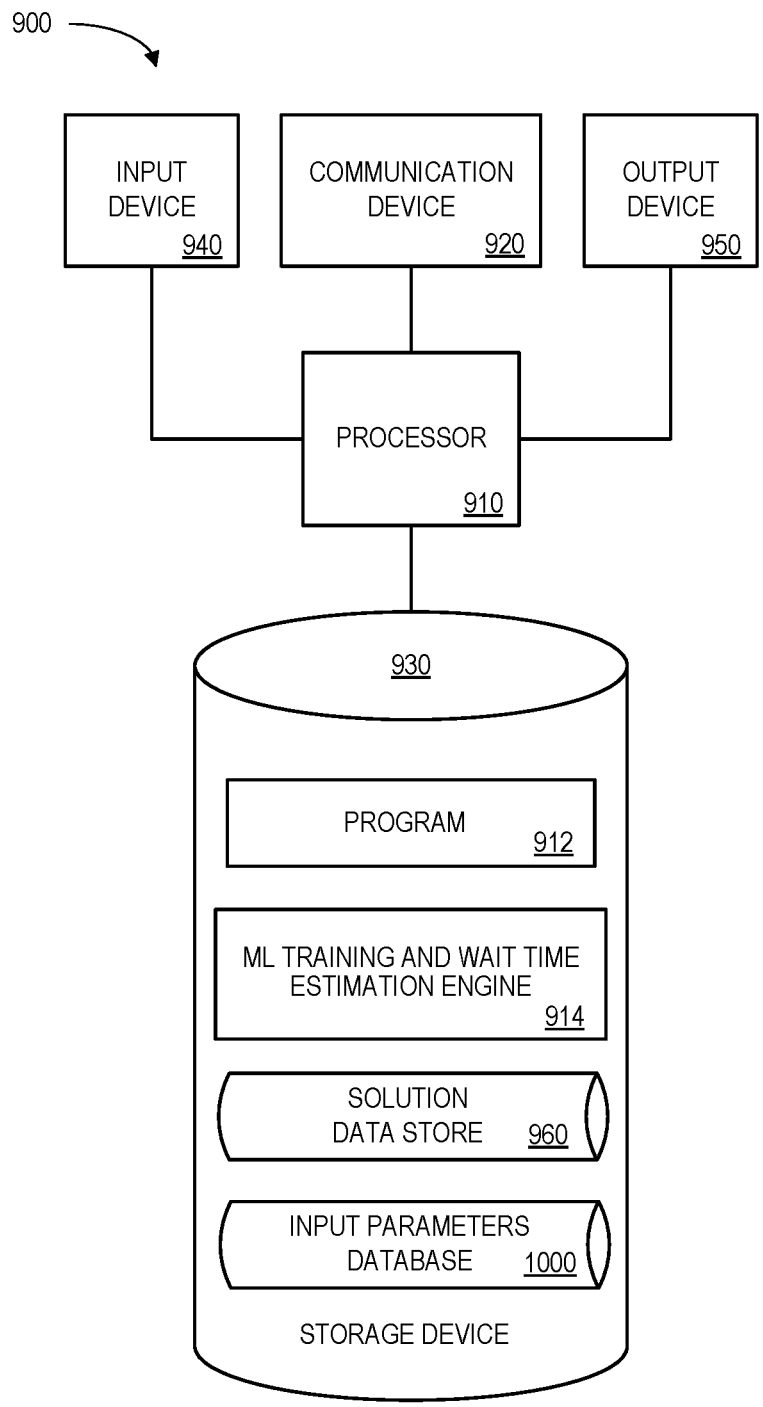
FIG. 9 is an apparatus or platform according to some embodiments.

Note that the embodiments described herein may be implemented using any number of different hardware configurations. For example, FIG. 9 is a block diagram of an apparatus or platform 900 that may be, for example, associated with the system 100 of FIG. 1 (and/or any other system described herein). The platform 900 comprises a processor 910, such as one or more commercially available CPUs in the form of one-chip microprocessors, coupled to a communication device 920 configured to communicate via a communication network (not shown in FIG. 9). The communication device 920 may be used to communicate, for example, with one or more remote user platforms, JSON schema data stores, etc. The platform 900 further includes an input device 940 (e.g., a computer mouse and/or keyboard to input information about wait time estimation or model preferences) and an output device 950 (e.g., a computer monitor to render a display, transmit recommendations or alerts, and/or create wait time estimation reports). According to some embodiments, a mobile device and/or PC associated with an operator or administrator may be used to exchange information with the platform 900.

The processor 910 also communicates with a storage device 930. The storage device 930 can be implemented as a single database or the different components of the storage device 930 can be distributed using multiple databases (that is, different deployment information storage options are possible). The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or a machine learning training and wait time estimation engine 914 for controlling the processor 910. The processor 910 performs instructions of the programs 912, 914, and thereby operates in accordance with any of the embodiments described herein. For example, the processor 910 may determine a set of database properties (e.g., direct and/or indirect properties such as a document type, a type of process, a number of items, etc.) associated with OLTP database table access. The processor 910 may then train a linear regression model based on the set of database properties and prior locking information (e.g., locking and unlocking timestamps) that represent access to the OLTP database table. In some embodiments, the processor 910 may use the linear regression model to generate, in substantially real-time, an estimated wait time for an OLTP database table access based on the database properties of the OLTP database table access.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

In some embodiments (such as the one shown in FIG. 9), the storage device 930 further stores a solution data store 960 and an input parameters database 1000. An example of a database that may be used in connection with the platform 900 will now be described in detail with respect to FIG. 10. Note that the database described herein is only one example, and additional and/or different information may be stored therein. Moreover, various databases might be split or combined in accordance with any of the embodiments described herein.

Referring to FIG. 10, a table is shown that represents the input parameters database 1000 that may be stored at the platform 900 according to some embodiments. The table may include, for example, entries identifying prior locks established in connection with an OLTP database. The table may also define fields 1002, 1004, 1006, 1008, 1010, 1012, 1014 for each of the entries. The fields 1002, 1004, 1006, 1008, 1010 may, according to some embodiments, specify: an access lock identifier 1002, a document type 1004, a number of line items 1006, a number of delivery items 1008, a status 1010, a locking process 1012, and a lock duration 1014. The input parameters database 1000 may be created and updated, for example, when a new OLTP database access is performed by a process, a new table is added to the system, an input parameter is added or removed, etc.

The access lock identifier 1002 identifier 1002 might be a unique alphanumeric label or link that is associated with a particular OLTP database access in accordance with any of the embodiments described herein. The document type 1004 may refer to the type of document being accessed (which may have an impact on how lock a lock exists). The number of line items 1006 and number of delivery items 1008 may be associated with a design 100 such as the one described in connection with FIG. 1. The status 1010 might indicate if the access is open or approved. The locking process 1012 might indicate who asked for the lock. All of these input parameters may impact the lock duration 1014 and the information can therefore be used to train a linear regression model.

Figure 11:
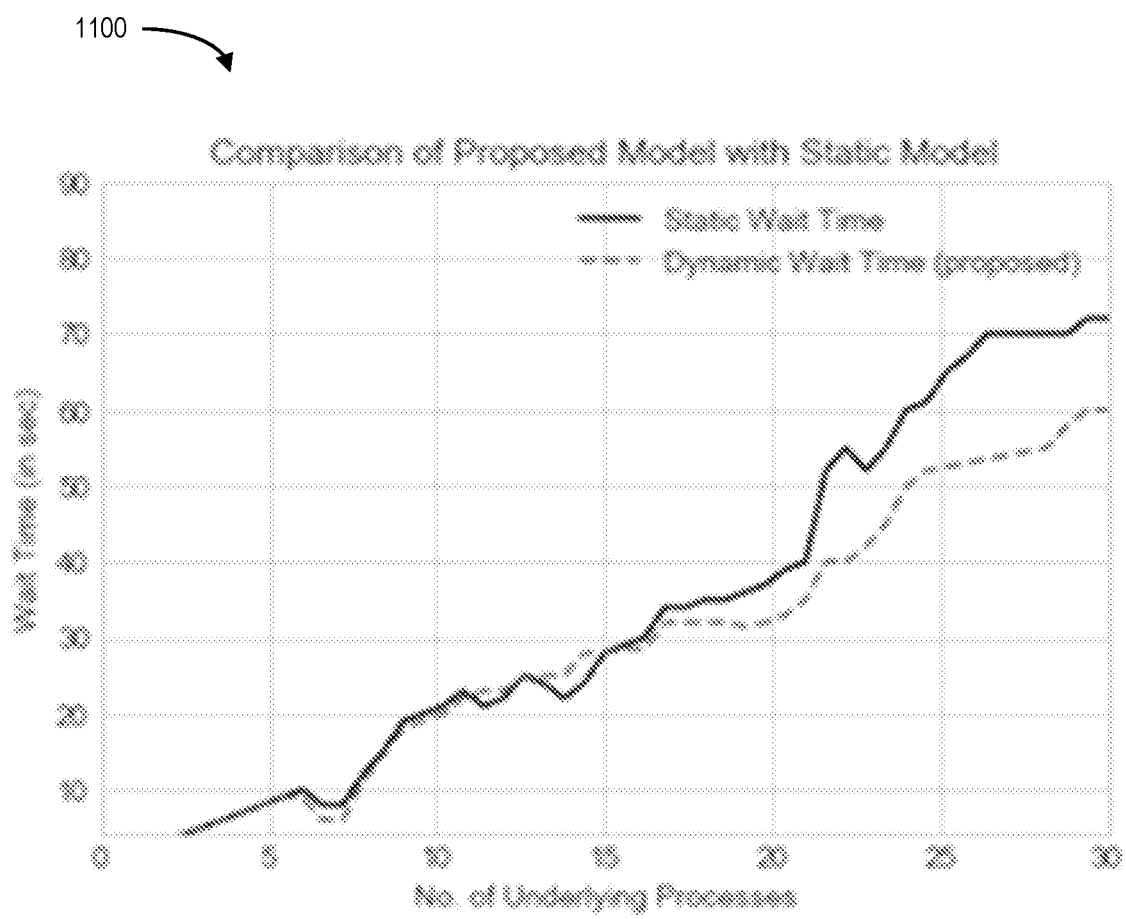
FIG. 11 illustrates results according to some embodiments.

Note that the efficiency of an implementation might be estimated by plugging in the wait time estimator in place of a traditional approach for wait time estimation (i.e., a fixed value of time after which the process resumes processing). The machine learning based approach may provide a significant boost in performance and failures of dependent processes. For example, FIG. 11 illustrates results 1100 according to some embodiments. The results 1100 show an increase in the efficiency of the process and an overall decrement in the total amount of time that was taken. Note that the proposed dynamic wait time (dashed line) model consistently performs better than the static approach (solid line) when the number of underlying processes is greater than fifteen.

In this way, embodiments may provide a machine learning regression-based framework to estimate the wait time for OLTP database locking. Embodiments may train the model during process runtime. Thereafter, the trained model may be to estimate the time for which a process locks a database table object. Some embodiments may use data buffering to reduce the load on the server and a dynamic self-improving model for increasing accuracy. Overall, with the usage of the framework, embodiments may provide an increase in efficiency of the dependent process as compared to a static wait time approach. Moreover, an intelligent selection of parameters used for training the model may further improve estimation results.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
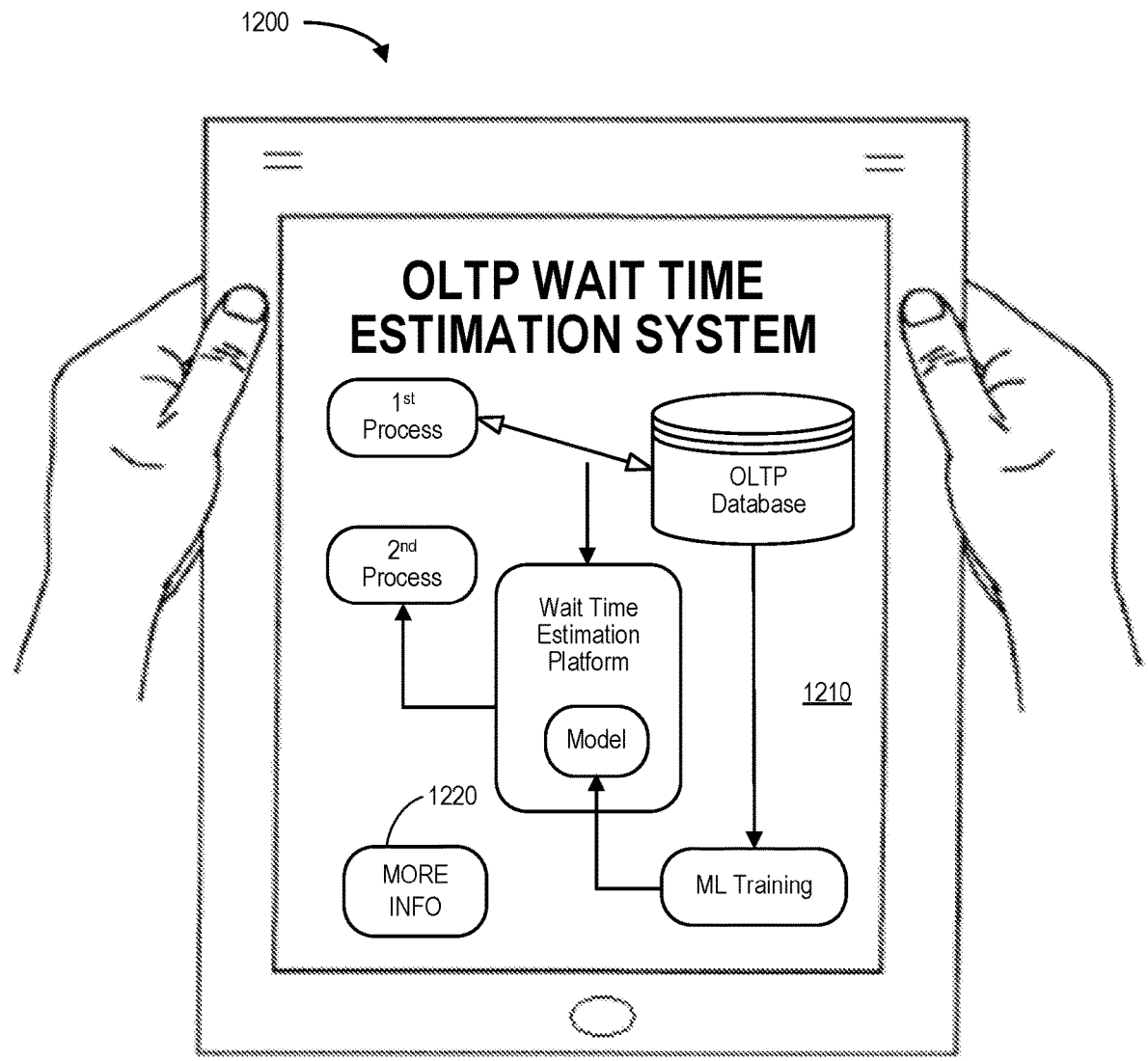
FIG. 12 illustrates a handheld tablet computer in accordance with some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of OLTP databases, any of the embodiments described herein could be applied to other types of OLTP tables. Moreover, the displays shown herein are provided only as examples, and any other type of user interface could be implemented. For example, FIG. 12 shows a handheld tablet computer 1200 rendering a OLTP wait time estimation system display 1210 that may be used to monitor the performance of components and/or to request additional information (e.g., via a "More Info" icon 1220).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with database access, comprising:
 a machine learning linear regression training platform, including:
  a computer processor; and
  a computer memory, coupled to the computer processor, storing instruction that, when executed by the computer processor, cause the machine learning linear regression training platform to:
   determine prior values for a type of process accessing an Online Transaction Processing ("OLTP") database table,
   determine prior values for a document type associated with OLTP database table access,
   determine prior values for a number of line items associated with OLTP database access,
   train a linear regression model, asynchronously using batches of prior locking information that include locking timestamps for enqueuing and unlocking timestamps for de-queuing, with the prior values for the type of process, document type, and number of line items and the batches of prior locking information representing access to the OLTP database table, and
   output the linear regression model; and
 a wait time estimation platform adapted to receive the linear regression model and execute the linear regression model to generate, in real-time, an estimated wait time for a current OLTP database table access based on current values for the type of process accessing the OLTP database table, the document type, and the number of line items,
wherein the estimated wait time is used by a process to automatically schedule a future access to the OLTP database.

2. The system of claim 1, further comprising:
the OLTP database table containing electronic records associated with an enterprise.

3. The system of claim 1, wherein the linear regression model is further trained using direct properties directly associated with the OLTP database table and indirect properties that are indirectly associated with the OLTP database table via a foreign key relationship.

4. The system of claim 1, wherein the linear regression model is further trained using a number of line items in a sales order, a number of line items in a delivery, a quantity of a sales order, and a sales order type.

5. The system of claim 1, wherein the machine learning linear regression training platform is further configured to automatically and dynamically update which values are used to train the linear regression model.

6. The system of claim 1, wherein the linear regression model is trained with Lasso L1 regularization.

7. The system of claim 6, wherein the linear regression model is optimized with an Orthant-Wise Limited-memory Quasi-Newton ("OWLQN") process.

8. The system of claim 7, wherein the linear regression model is evaluated with correlation and Mean Absolute Error ("MAE").

9. The system of claim 1, wherein the wait time estimation platform incorporates a data buffering framework with a solution database to reduce use of the linear regression model.

10. A method associated with database access, comprising:
determining, by a computer processor of a machine learning linear regression training platform, prior values for a type of process accessing an Online Transaction Processing ("OLTP") database table access;
determining, by the computer processor of the machine learning linear regression training platform, prior values for a document type associated with OLTP database table access;
determining, by the computer processor of the machine learning linear regression training platform, prior values for a number of line items associated with OLTP database table access;
training, by the computer processor of the machine learning linear regression training platform, a linear regression model, asynchronously using batches of prior locking information that include locking timestamps for enqueuing and unlocking timestamps for de-queuing, with the prior values for the type of process, document type, and number of line items and the batches of prior locking information representing access to the OLTP database table;
outputting the linear regression model from the machine learning linear regression training platform;
receiving, by a wait time estimation platform, the linear regression model; and
using, by the wait time estimation platform, the linear regression model to generate, in real-time, an estimated wait time for a current OLTP database table access based on current values for the type of process accessing the OLTP database, the document type, and the number of line items,
wherein the estimated wait time is used by a process to automatically schedule a future access to the OLTP database.

11. The method of claim 10, wherein the linear regression model is further trained using direct properties directly associated with the OLTP database table and indirect properties that are indirectly associated with the OLTP database table via a foreign key relationship.

12. The method of claim 10, wherein the linear regression model is further trained using a number of line items in a sales order, a number of line items in a delivery, a quantity of a sales order, and a sales order type.

13. A non-transitory, computer readable medium having executable instructions stored therein that, when executed by a computer processor cause the processor to perform a method associated with database access, the method comprising:
determining, by a computer processor of a machine learning linear regression training platform, prior values for a type of process accessing an Online Transaction Processing ("OLTP") database table access;
determining, by the computer processor of the machine learning linear regression training platform, prior values for a document type associated with OLTP database table access;
determining, by the computer processor of the machine learning linear regression training platform, prior values for a number of line items associated with OLTP database table access;
training, by the computer processor of the machine learning linear regression training platform, a linear regression model, asynchronously using batches of prior locking information that include locking timestamps for enqueuing and unlocking timestamps for de-queuing, with the prior values for the type of process, document type, and number of line items and the batches of prior locking information representing access to the OLTP database table;
outputting the linear regression model from the machine learning linear regression platform;
receiving, by a wait time estimation platform, the linear regression model; and
using, by the wait time estimation platform, the linear regression model to generate, in real-time, an estimated wait time for a current OLTP database table access based on current values for the type of process accessing the OLTP database, the document type, and the number of line items,
wherein the estimated wait time is used by a process to automatically schedule a future access to the OLTP database.

14. The medium of claim 13, wherein the linear regression model is trained with Lasso L1 regularization, the linear regression model is optimized with an Orthant-Wise Limited-memory Quasi-Newton ("OWLQN") process, and the linear regression model is evaluated with correlation and Mean Absolute Error ("MAE").

15. The medium of claim 13, wherein the wait time estimation platform incorporates a data buffering framework with a solution database to reduce use of the linear regression model.

* * * * *